Aug. 8, 1950  R. H. HOLMWOOD ET AL  2,518,010
STENCIL CARD MAKING MACHINE
Filed Feb. 12, 1947  19 Sheets-Sheet 1

INVENTORS
RICHARD H. HOLMWOOD
PAUL A. HAUCK
BY
J. B. Sponsler
AGENT

Aug. 8, 1950     R. H. HOLMWOOD ET AL     2,518,010
STENCIL CARD MAKING MACHINE

Filed Feb. 12, 1947     19 Sheets-Sheet 2

INVENTORS
RICHARD H. HOLMWOOD
PAUL A. HAUCK
BY
J. B. Sponsler
AGENT

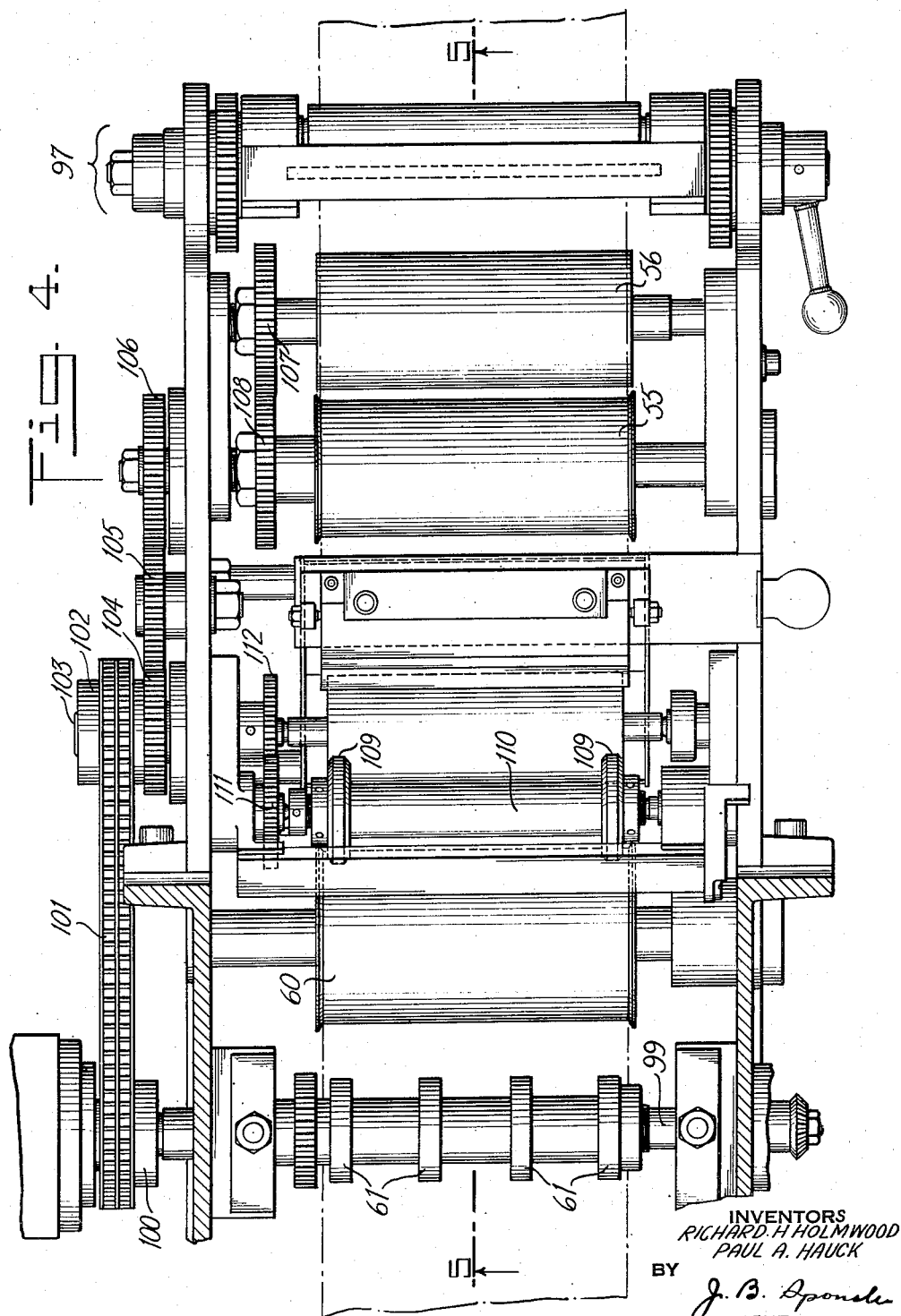

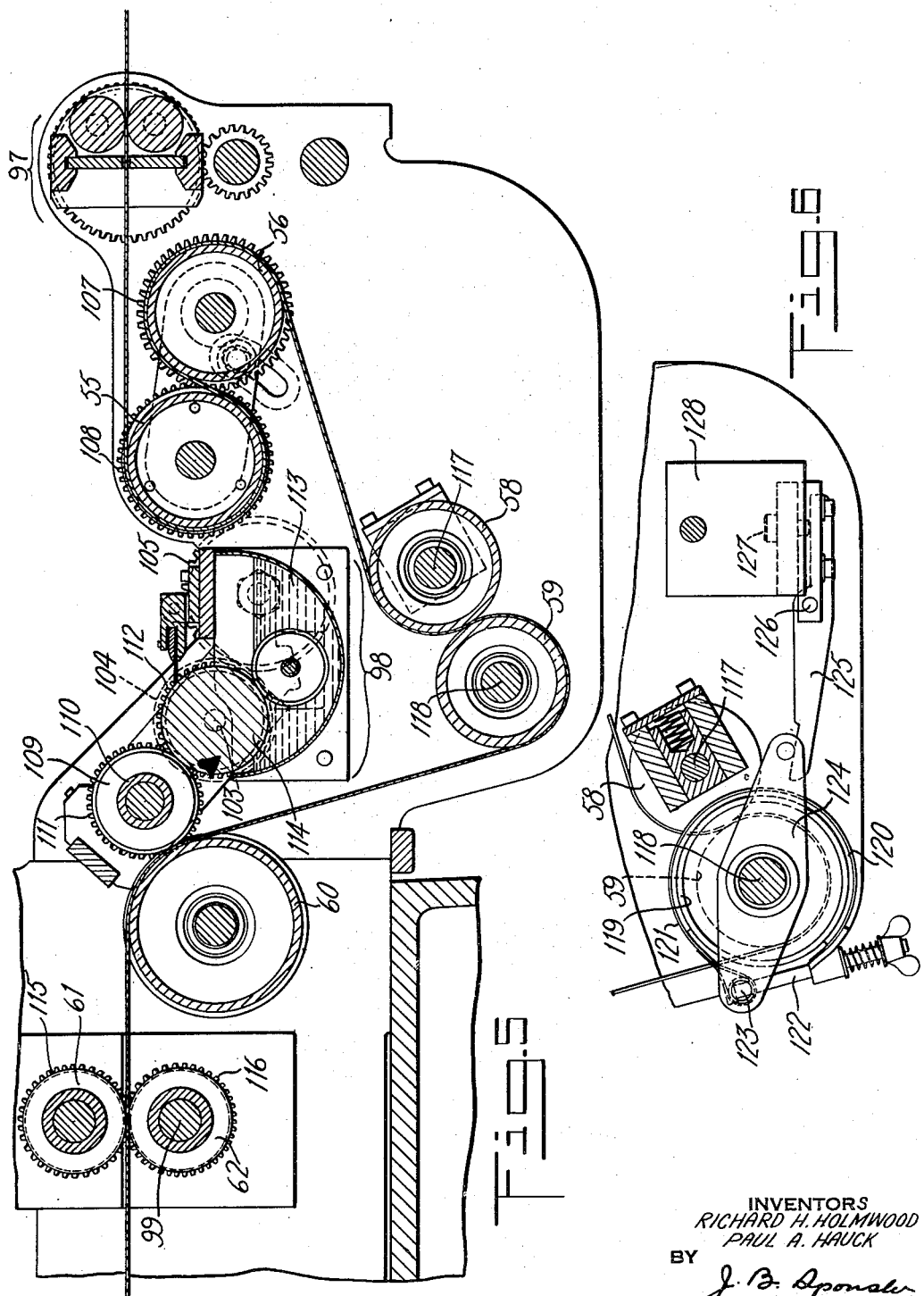

Aug. 8, 1950     R. H. HOLMWOOD ET AL     2,518,010
STENCIL CARD MAKING MACHINE
Filed Feb. 12, 1947     19 Sheets-Sheet 5
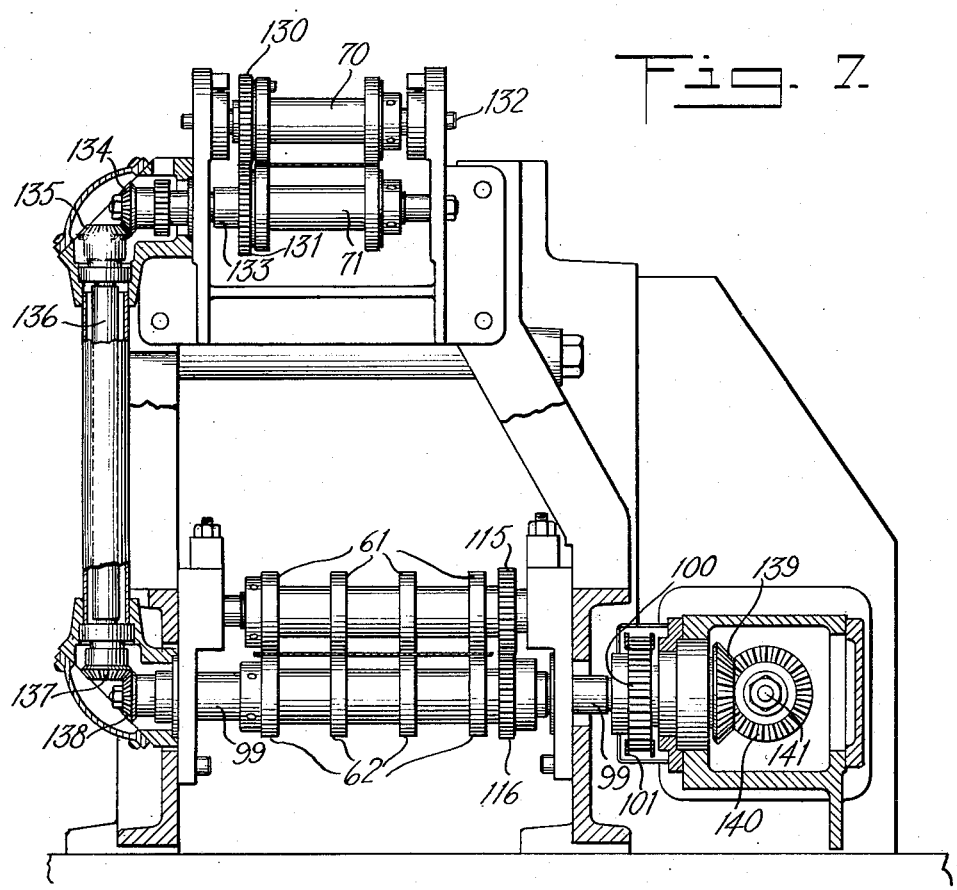
INVENTORS
RICHARD H. HOLMWOOD
PAUL A. HAUCK
BY
J. B. Sponsler
AGENT

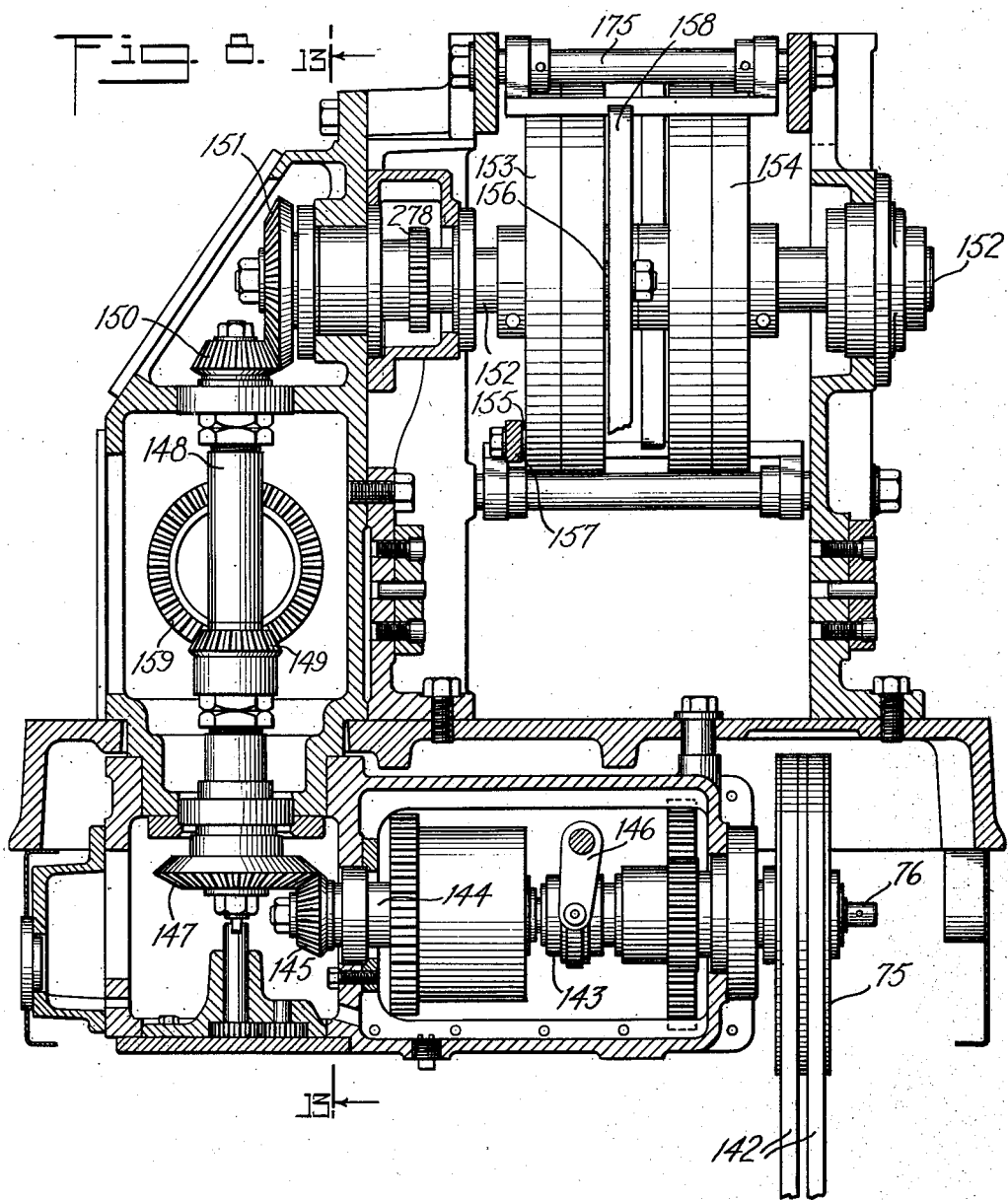

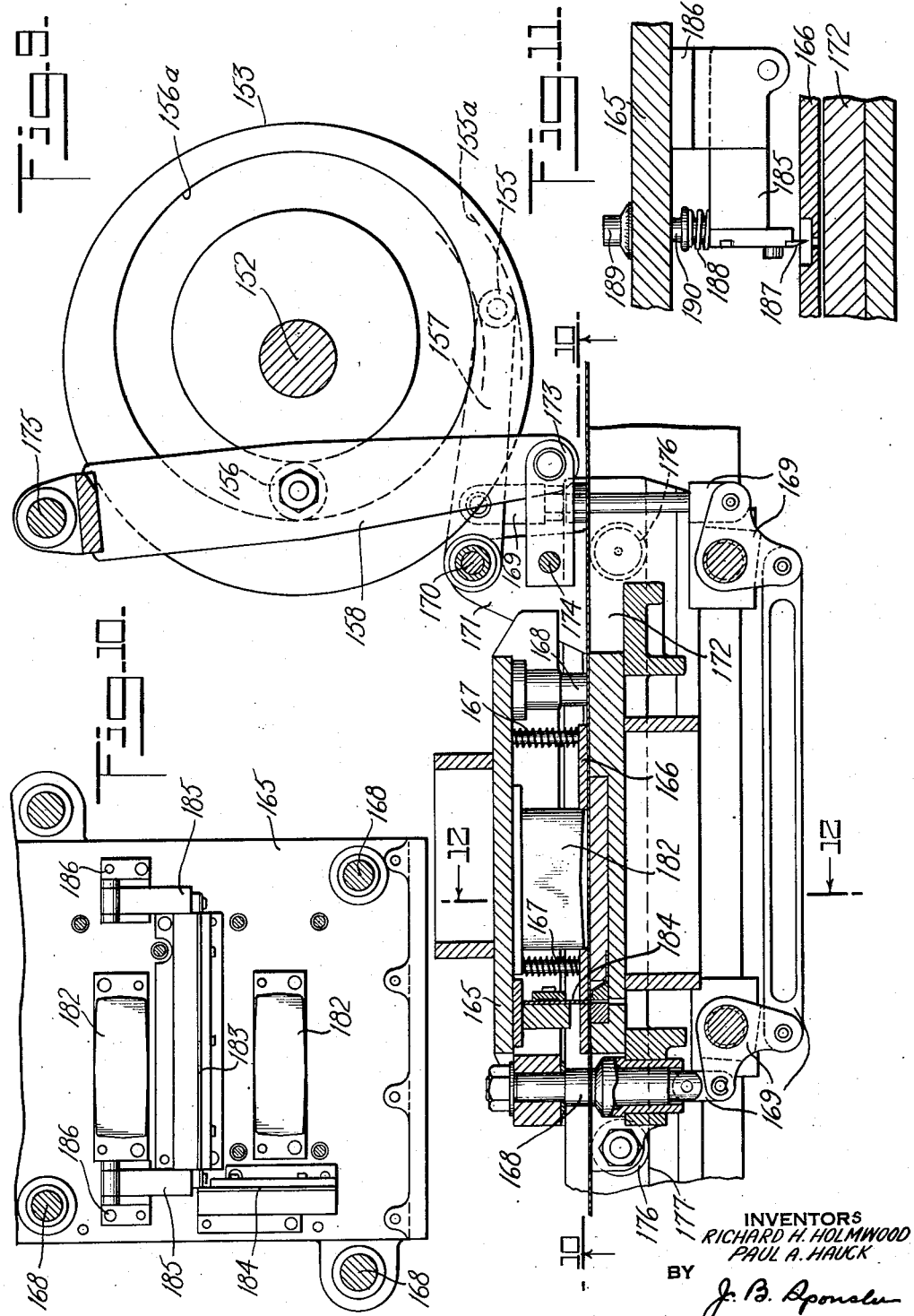

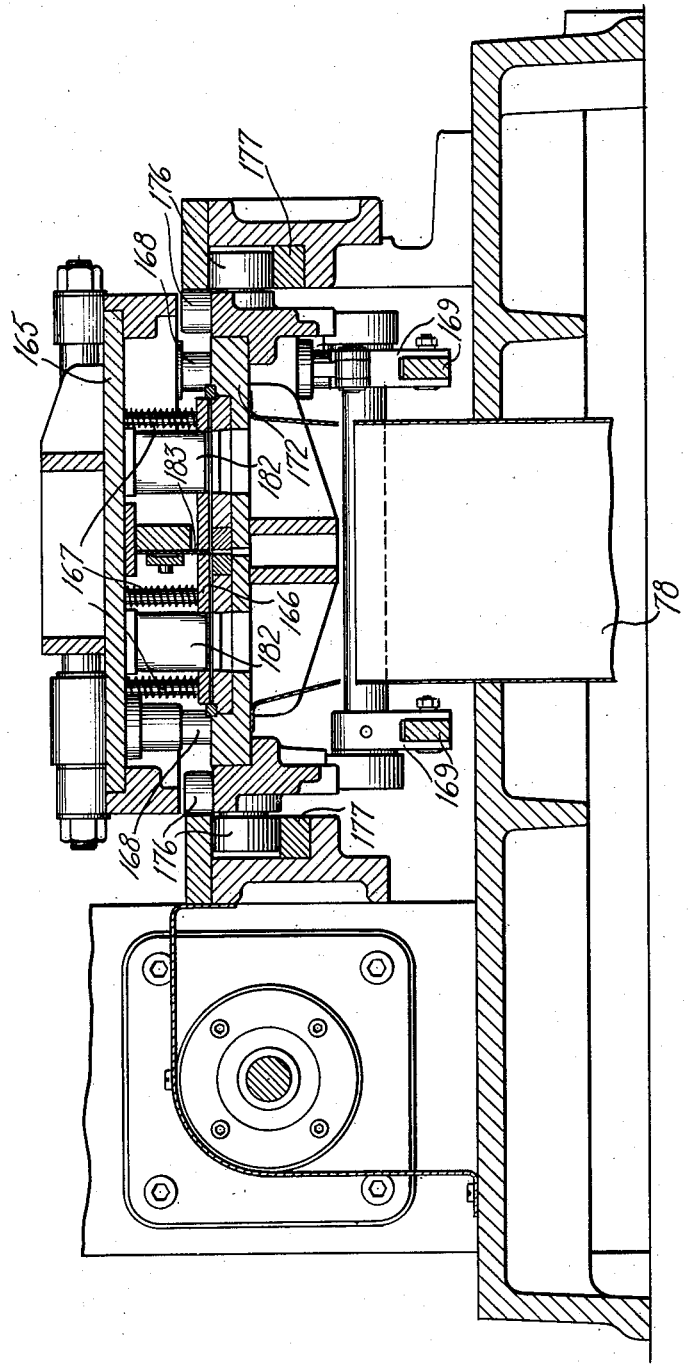

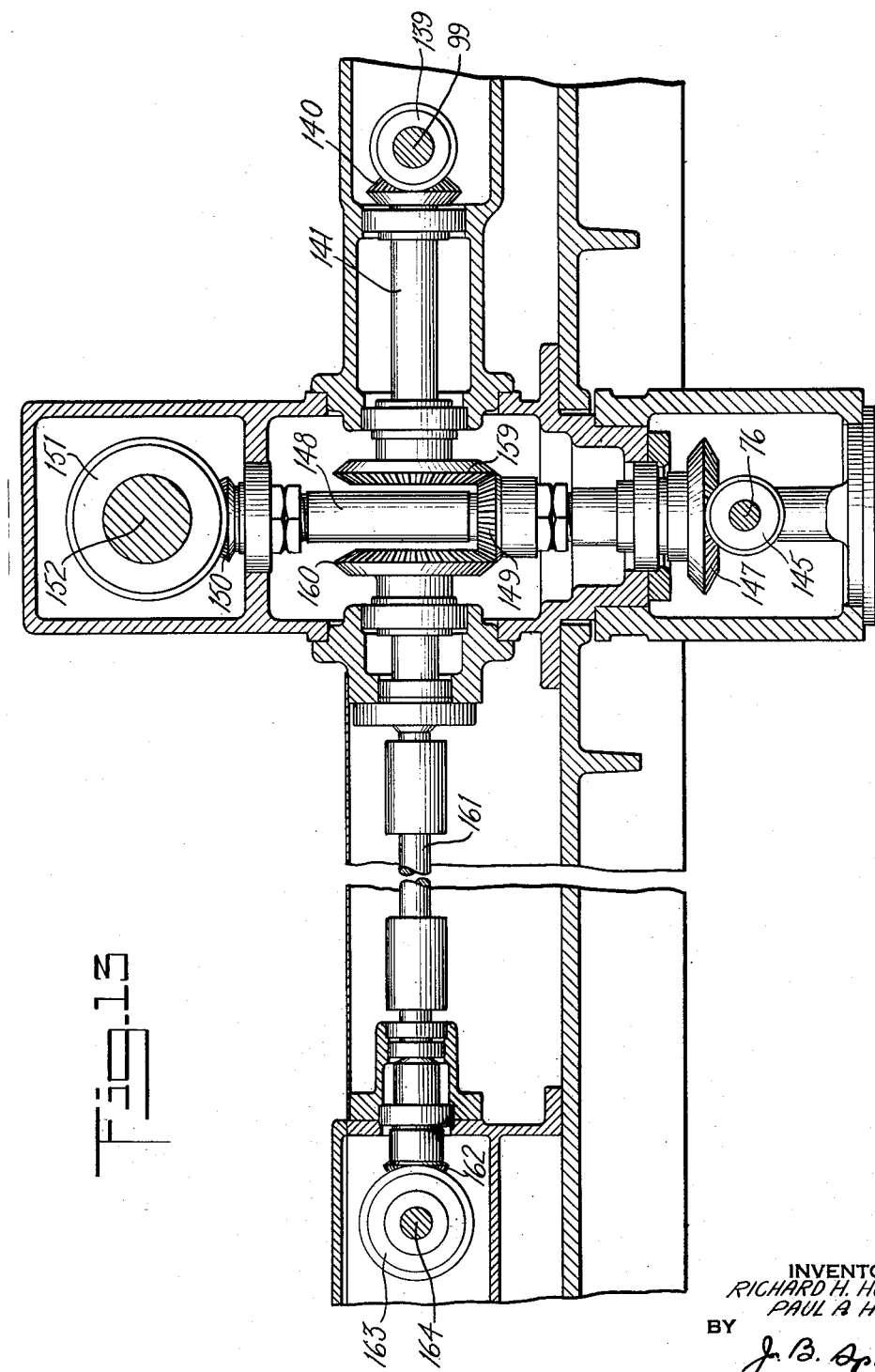

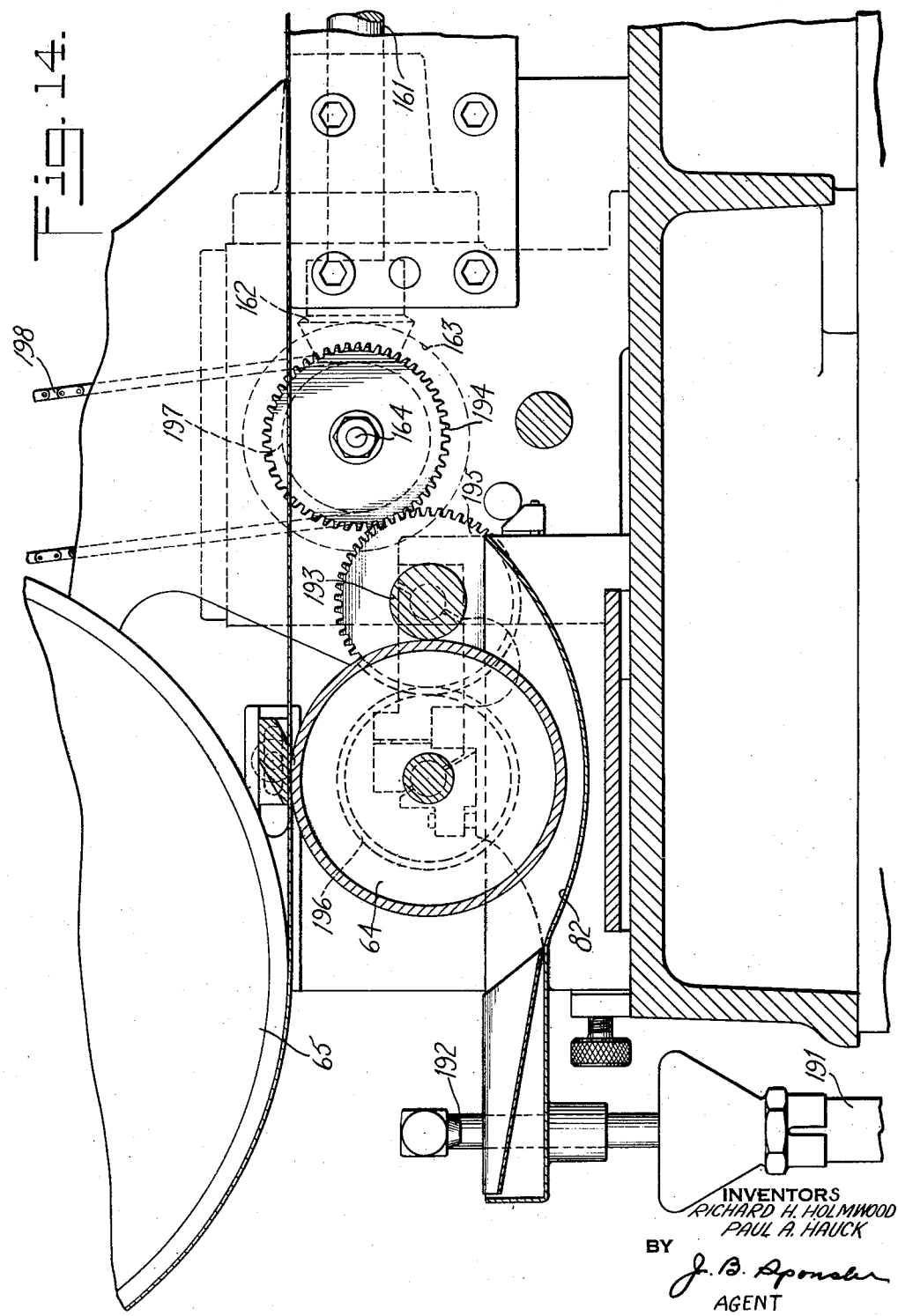

Aug. 8, 1950     R. H. HOLMWOOD ET AL     2,518,010
STENCIL CARD MAKING MACHINE
Filed Feb. 12, 1947     19 Sheets-Sheet 11
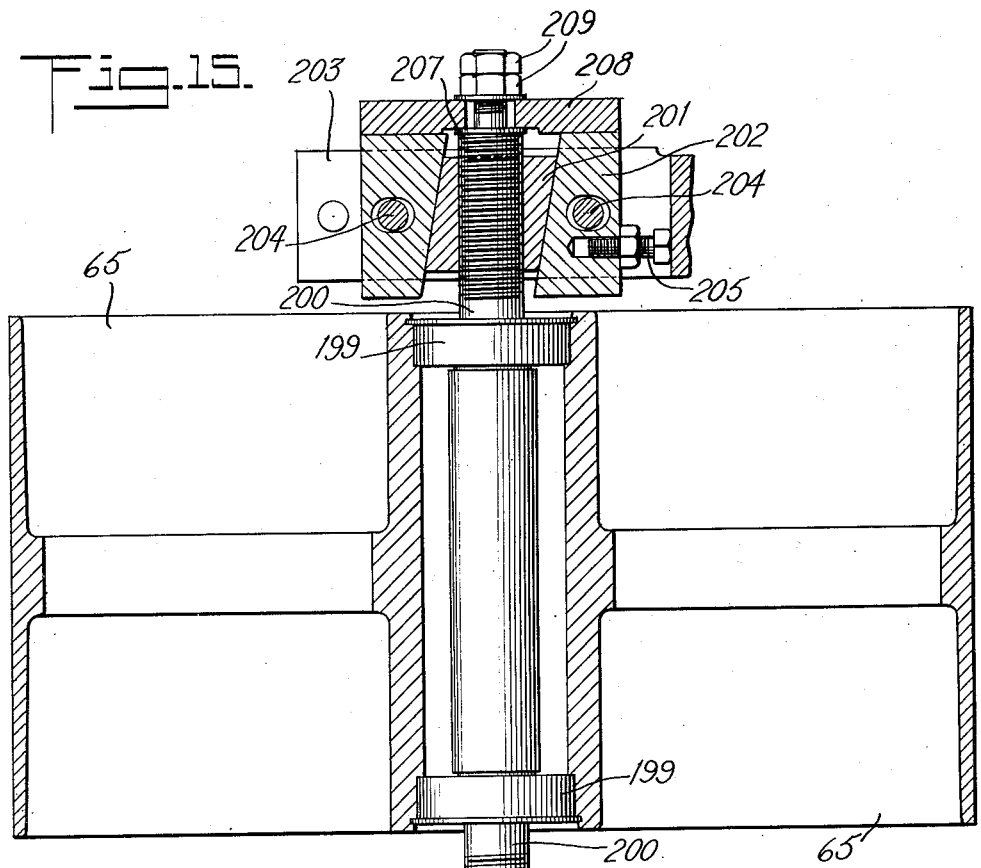
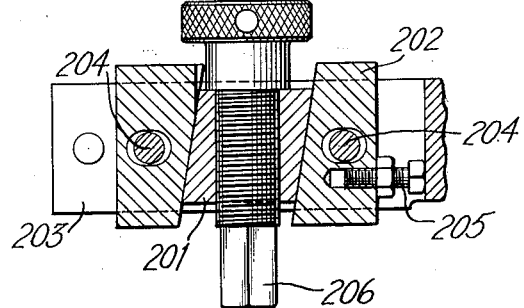
INVENTORS
RICHARD H. HOLMWOOD
PAUL A. HAUCK
BY
AGENT

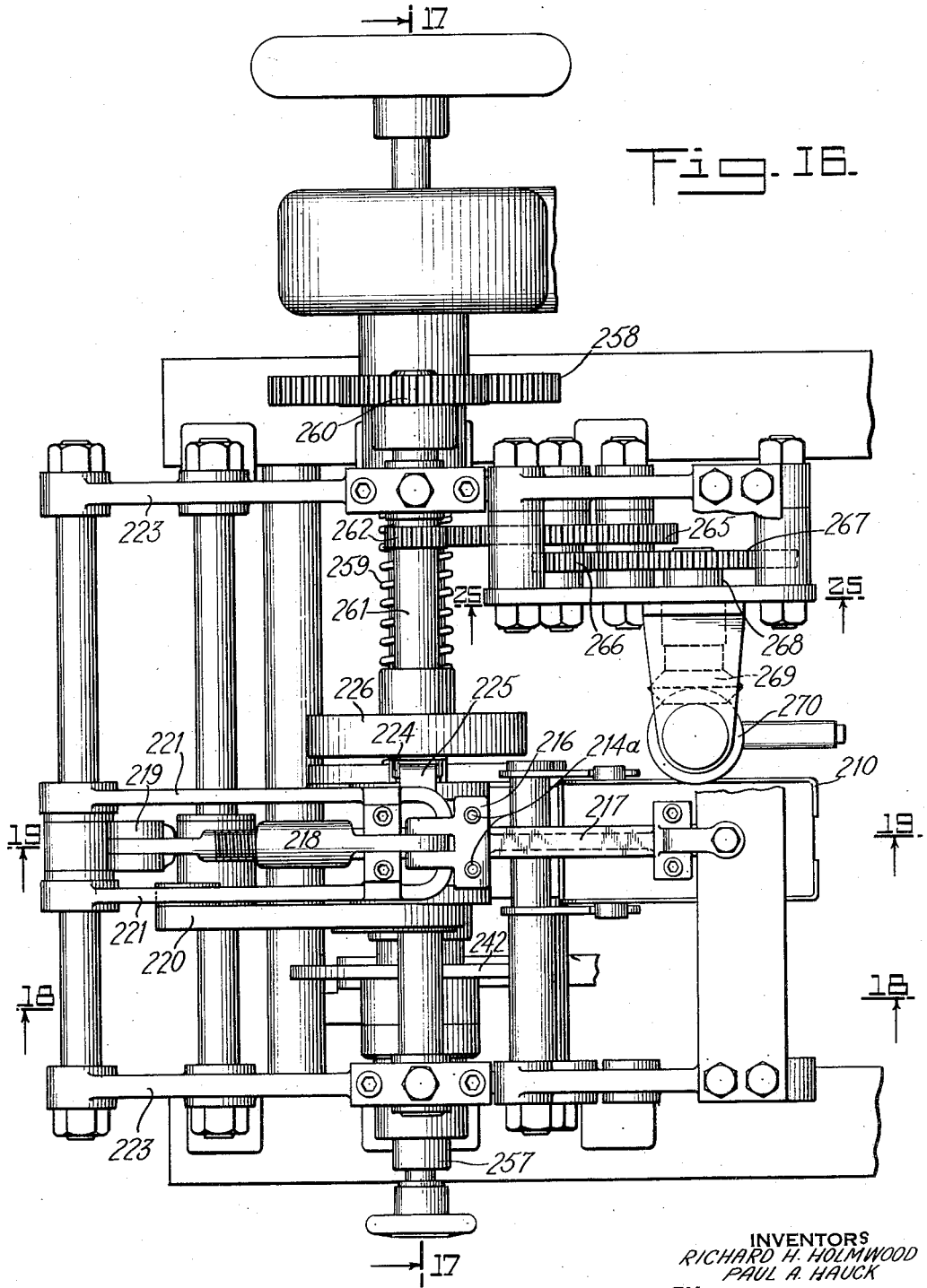

Aug. 8, 1950    R. H. HOLMWOOD ET AL    2,518,010
STENCIL CARD MAKING MACHINE
Filed Feb. 12, 1947    19 Sheets-Sheet 13
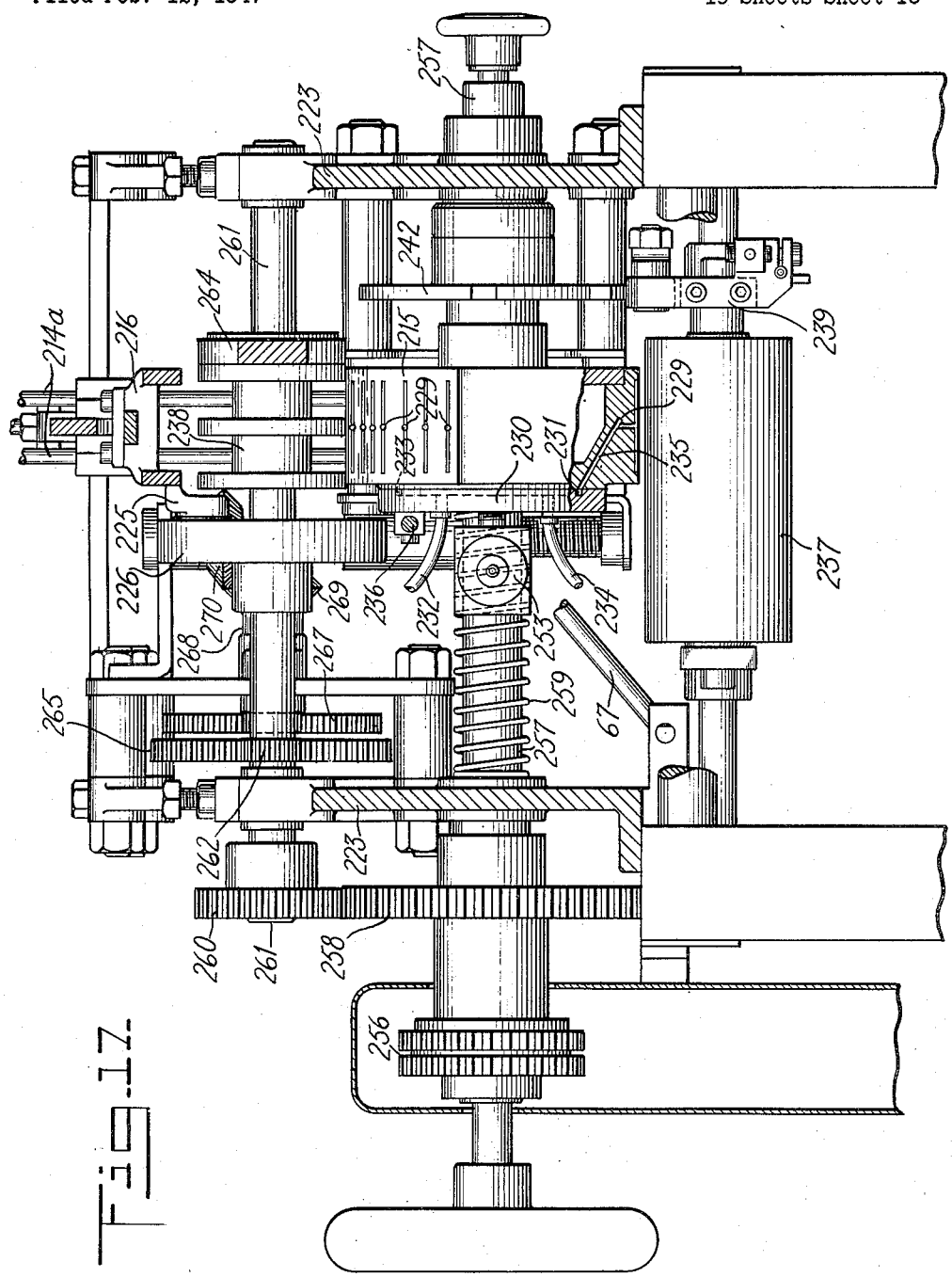
INVENTORS
RICHARD H. HOLMWOOD
PAUL A. HAUCK
BY
J. B. Spomsler
AGENT Aug. 8, 1950    R. H. HOLMWOOD ET AL    2,518,010
STENCIL CARD MAKING MACHINE
Filed Feb. 12, 1947            19 Sheets-Sheet 14
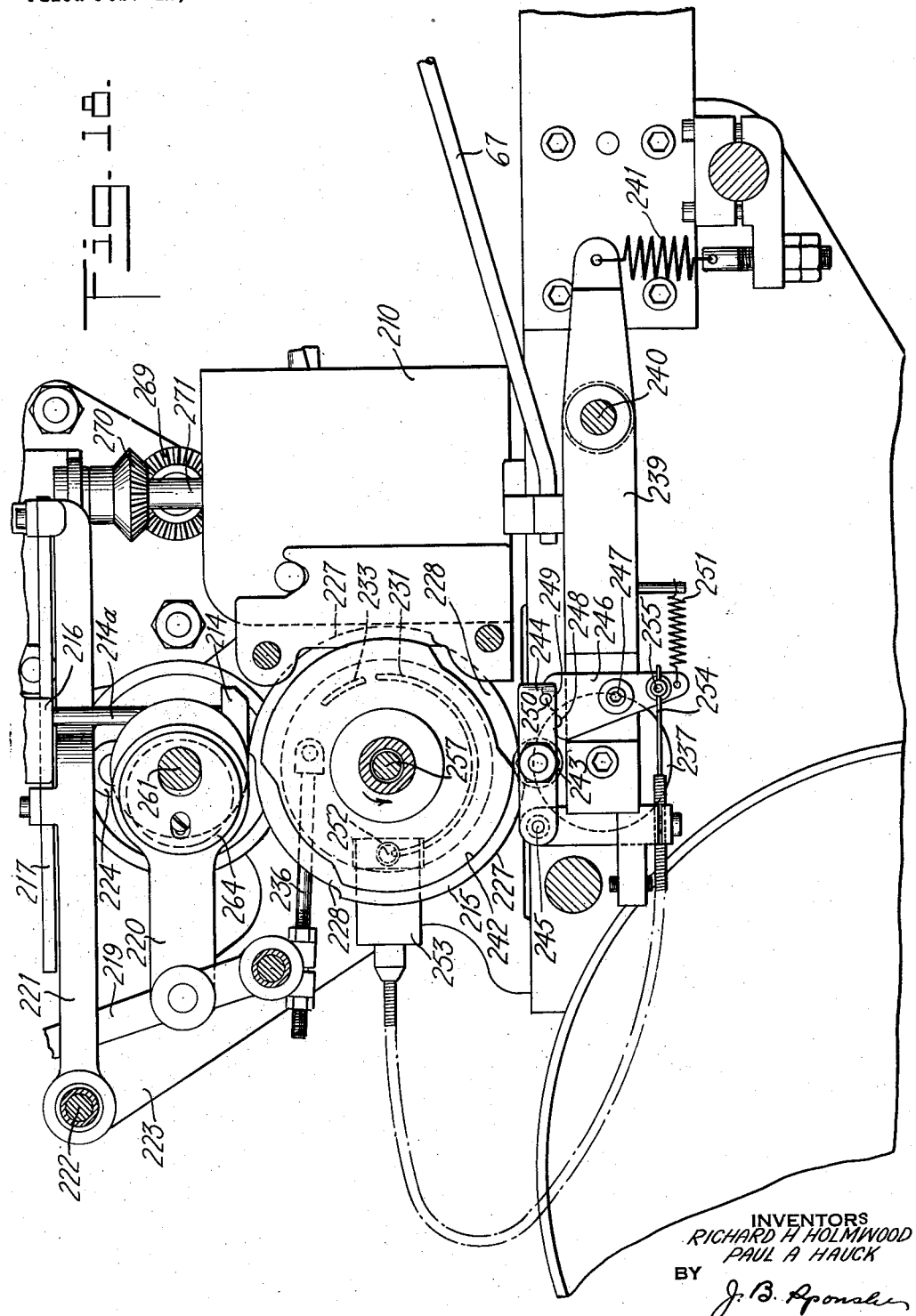
INVENTORS
RICHARD H HOLMWOOD
PAUL A HAUCK
BY
J. B. Sponsler
AGENT Aug. 8, 1950  R. H. HOLMWOOD ET AL  2,518,010
STENCIL CARD MAKING MACHINE
Filed Feb. 12, 1947  19 Sheets-Sheet 15
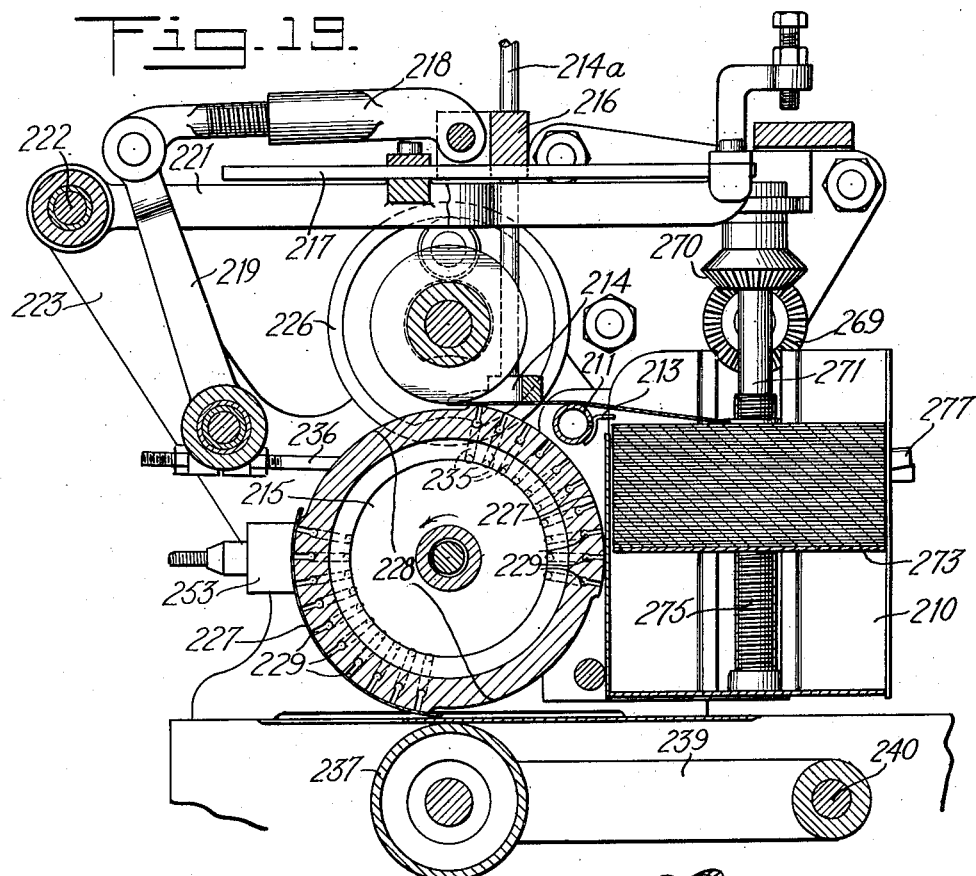
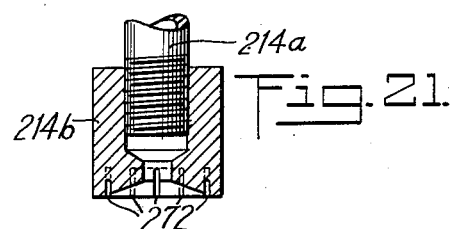
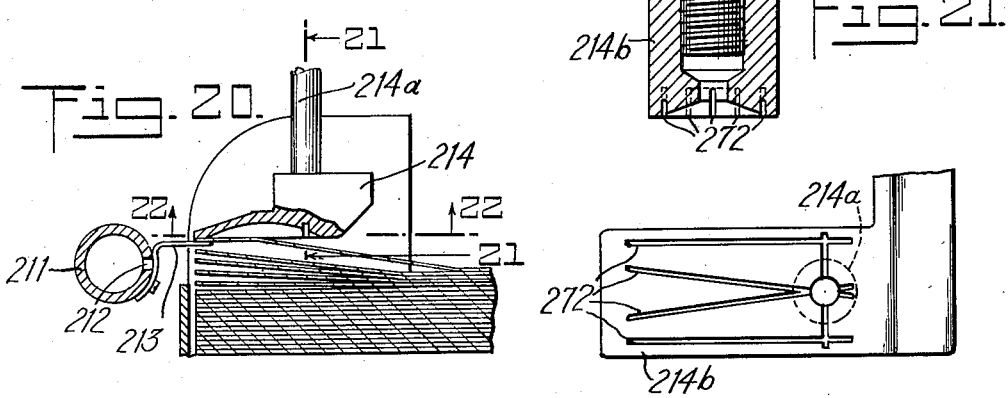
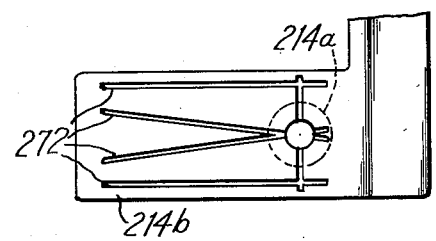
INVENTORS
RICHARD H. HOLMWOOD
PAUL A. HAUCK
BY
J. B. Sponsler
AGENT

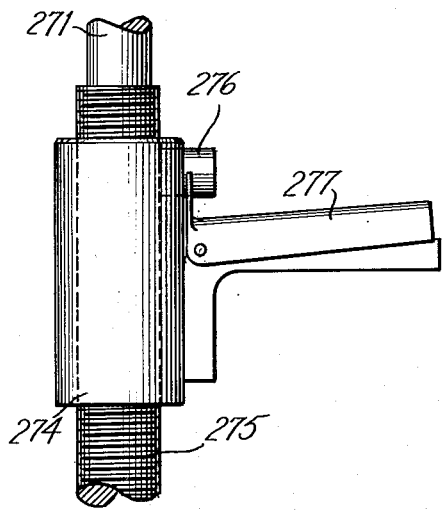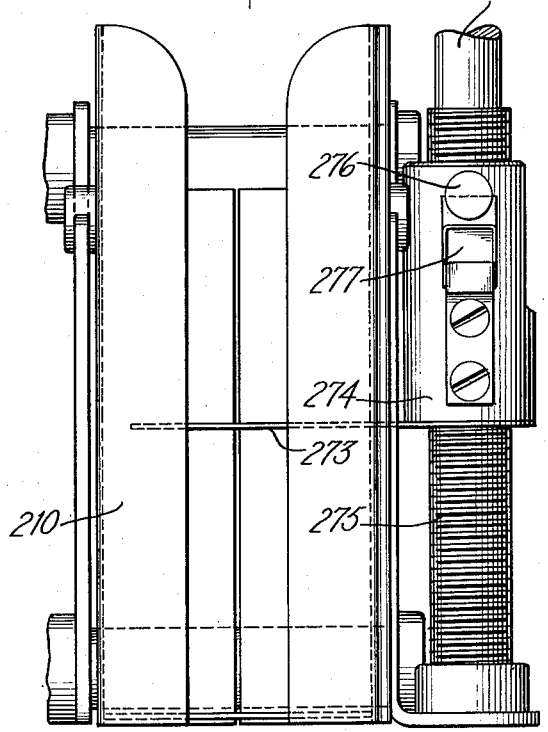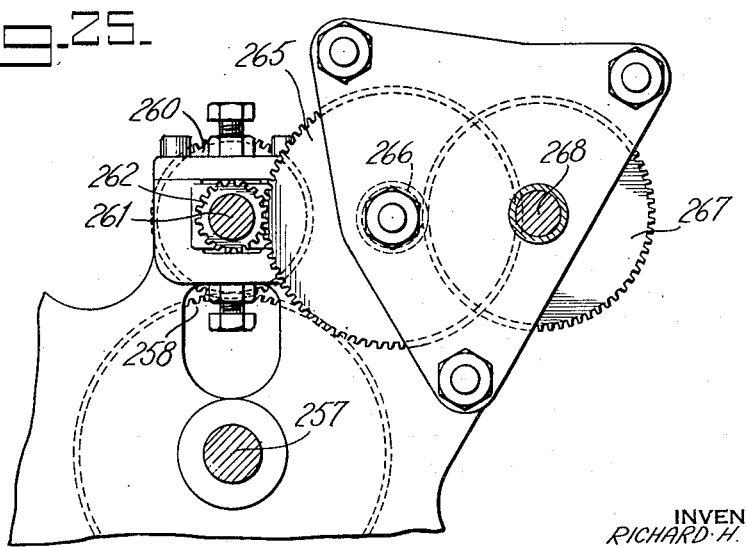

Aug. 8, 1950 — R. H. HOLMWOOD ET AL — 2,518,010
STENCIL CARD MAKING MACHINE
Filed Feb. 12, 1947 — 19 Sheets-Sheet 17

INVENTORS
RICHARD H. HOLMWOOD
PAUL A. HAUCK
BY
J. B. Sponsler
AGENT

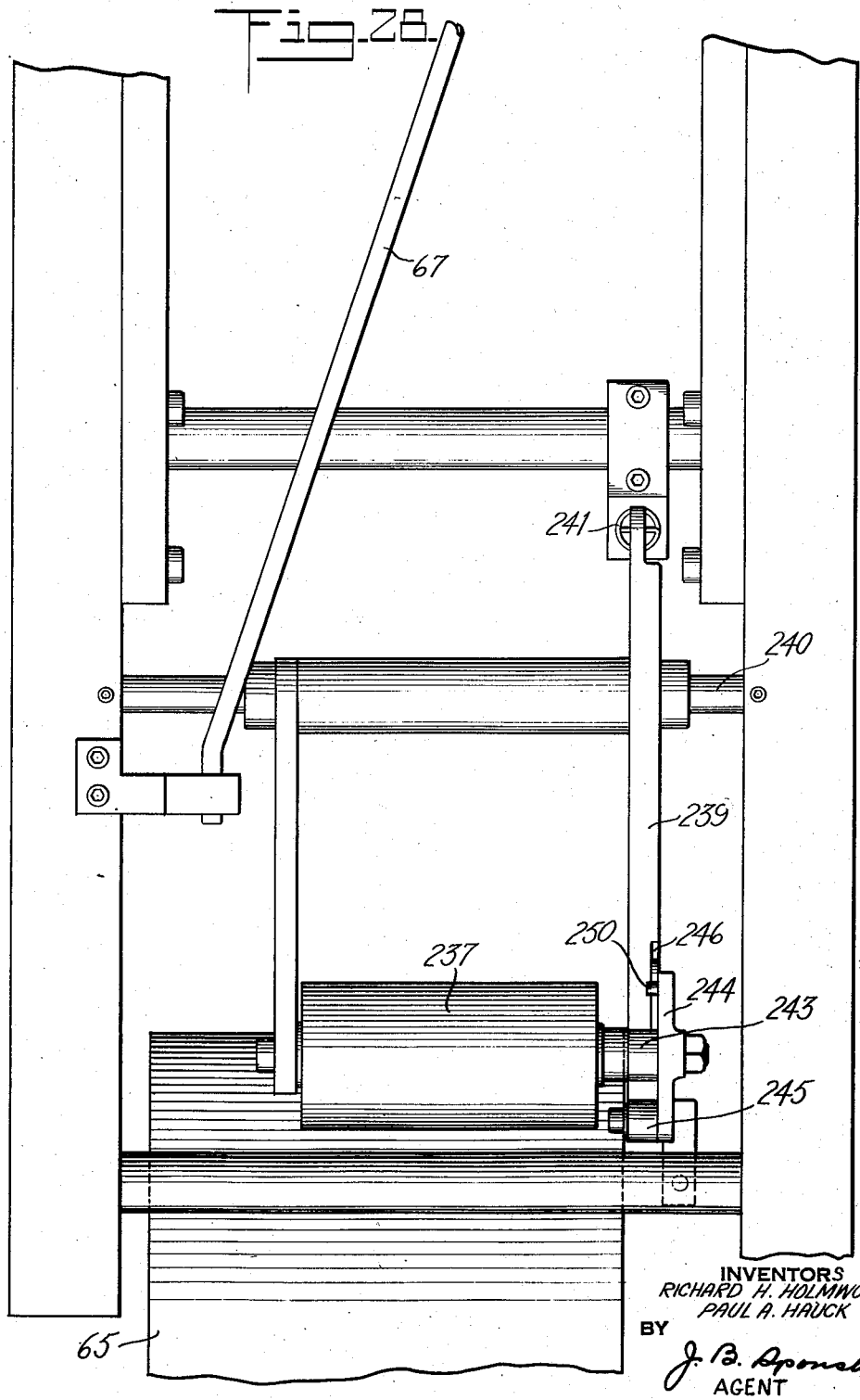

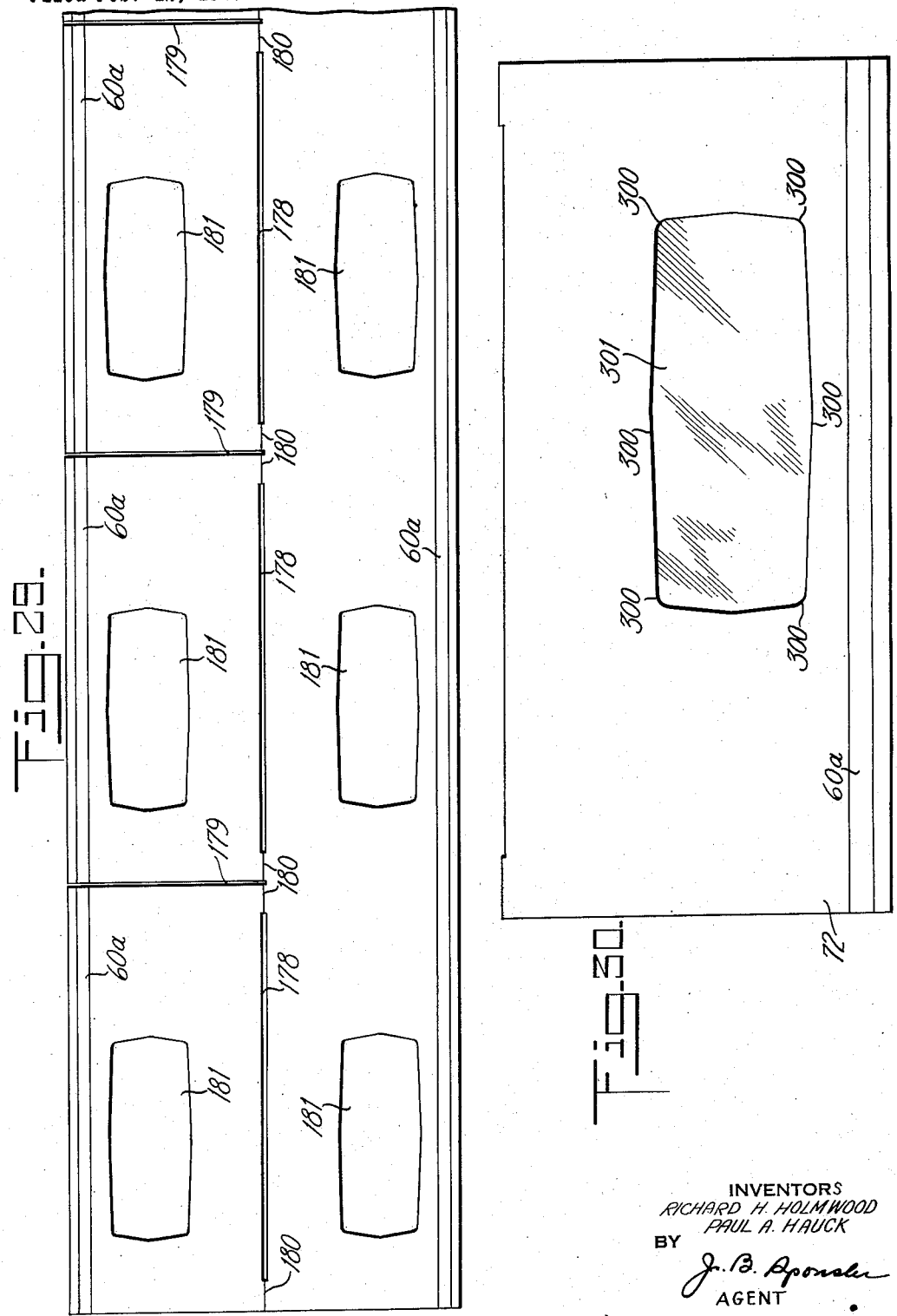

Patented Aug. 8, 1950

2,518,010

UNITED STATES PATENT OFFICE 2,518,010

STENCIL CARD MAKING MACHINE

Richard H. Holmwood, Binghamton, N. Y., and Paul A. Hauck, Union, N. J., assignors to International Business Machines Corporation, New York, N. Y., a corporation of New York Application February 12, 1947, Serial No. 728,050

1 Claim. (Cl. 93—1)

This invention relates to a machine for processing a web to produce a composite product such as a stencil strip, similar to that described in U. S. Patent No. 1,034,600.

Particularly, the machine works on a blank continuous strip of material performing successive operations of perforating, applying adhesive, attaching stencil material, folding, pressing, and cutting to form card lengths each having a portion containing a stencil similar to cards illustrated in U. S. Patent 2,375,308. The particular card produced may be used as a record card in automatic accounting machines, or the like, and possesses the added distinction of being capable of use for reproducing certain data legibly cut in the stencil portion, corresponding to perforations in the card.

The broad object of this invention is to provide a machine for rapidly producing stencil cards from a continuous web and a plurality of precut stencil sheets.

The invention includes novel mechanism for loading a roll of stock or web material onto the supply spindle of the machine; means for perforating a pattern into a single ply web whereby, with folding the web, a two ply web is formed having coincidental windows in each ply; unique mechanism for attaching portions of stencil material to fill the windows in the web; a novel label picker for removing singly a stencil sheet from a stack of such sheets and delivering it to the attaching mechanism; and a unique registration control in connection with a mechanism for severing the web into card lengths.

Another object of the invention is to provide means for preventing adhesive material from contaminating certain feeding components of a machine of this type when the supply of stencil sheets in the machine becomes exhausted.

Other objects of the invention will be pointed out in the following description and claim and illustrated in the accompanying drawings, which disclose, by way of example, the principle of the invention and the best mode, which has been contemplated, of applying that principle.

In the drawings:

Fig. 4 is a plan view of the stock feeding and inking mechanism.

Fig. 5 is a sectional view of the stock feeding and inking mechanism along the lines 5—5 of Fig. 4.

Fig. 6 is a detail view of the tension indicating mechanism which is incorporated into the stock feeding and inking mechanism.

Fig. 7 is a sectional view of the feed rolls and ejector rolls along the line 7—7 of Fig. 1.

Fig. 8 is a partial view in section of the drive mechanism.

Fig. 9 is a sectional view of the piercing and slitting die mechanism.

Fig. 10 is a sectional view of the piercing and slitting die along the line 10—10 of Fig. 9.

Fig. 11 is a detail view of the slitting mechanism.

Fig. 12 is a sectional view of the piercing and slitting die along the line 12—12 of Fig. 9.

Fig. 13 is a sectional view of the drive mechanism along the line 13—13 of Fig. 8.

Fig. 14 is a view in section of the adhesive applicating mechanism.

Fig. 15 is a detail view of the stock reversing roll registering mechanism.

Fig. 16 is a plan view of the stencil tissue feeding mechanism.

Fig. 17 is a sectional view of Fig. 16 along the line 17—17.

Fig. 18 is a sectional view showing the mechanism, which prevents contamination of certain of the working parts by the adhesive, along the line 18—18 of Fig. 16.

Fig. 19 is a sectional view illustrating certain components of the tissue feeding mechanism taken along the line 19—19 of Fig. 16.

Fig. 20 is a detail view of the tissue picker and the tissue supply magazine.

Fig. 21 is a sectional view of the tissue picker along the line 21—21 of Fig. 20.

Fig. 22 is a detail view of the bottom of one of the two toes of the tissue picker.

Fig. 23 is a detail view of the tissue supply magazine feed mechanism.

Fig. 24 is a detail view of the tissue supply magazine feed mechanism release.

Fig. 25 is a detail view in sections of the reduction gearing for the tissue supply magazine feed mechanism taken along the line 25—25 of Fig. 16.

Fig. 28 is a detail view in plan of the folding rod and associated parts.

Fig. 29 is a plan view of a portion of the card stock after it leaves the piercing and slitting die mechanism.

Fig. 30 is a plan view of the stencil card as it leaves the ejector rolls.

Figure 1:
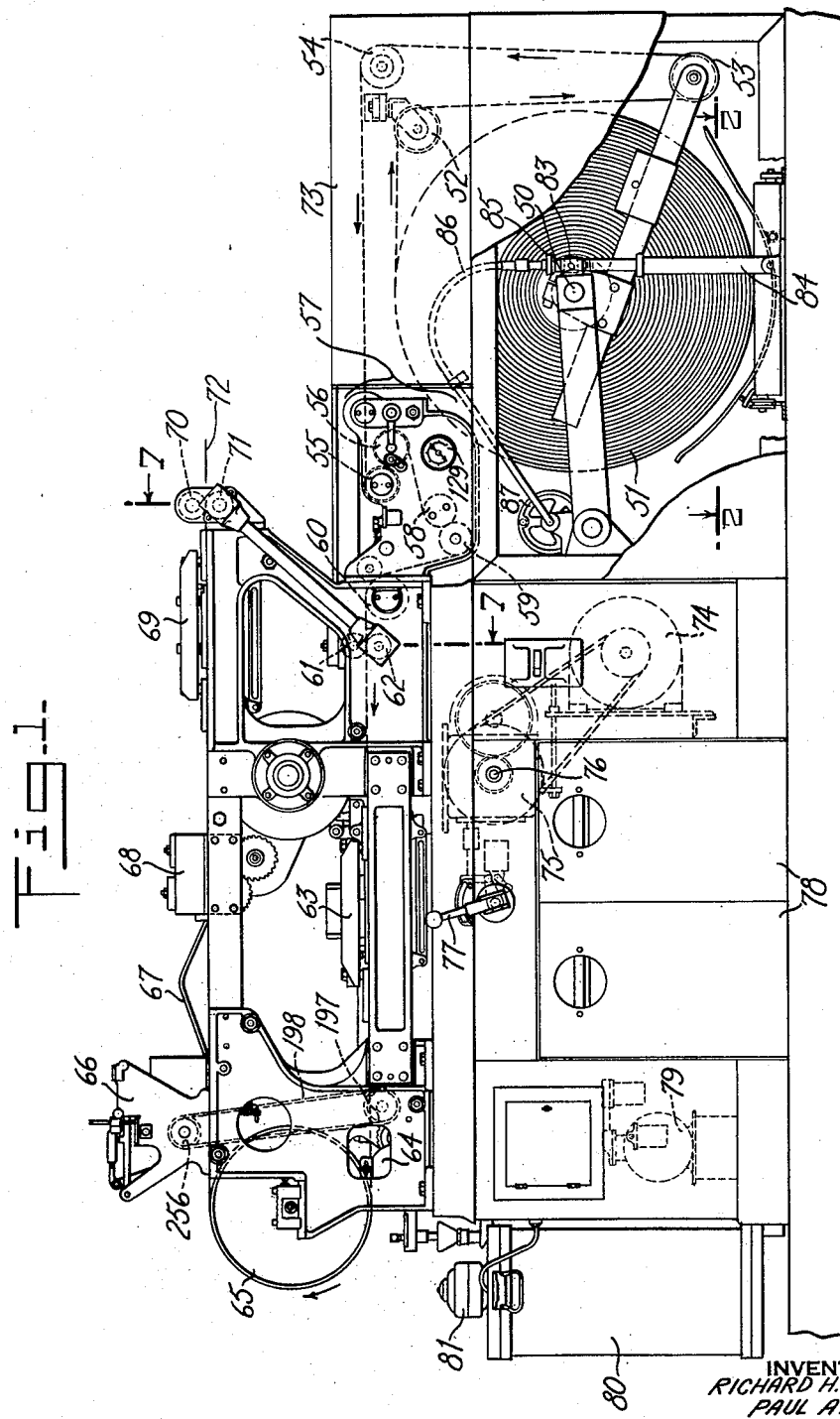
Fig. 1 is a side view of the machine.

An understanding of the functioning and operation of the subject invention may be inferred from examination of Fig. 1, which shows the overall layout of the stencil card machine and the arrangement of its components.

A spindle 50 carries a roll of double width card stock 51 which is fed over an idler roll 52 to be engaged by a tensioning roller 53 and thence over a guide roller 54 to a pair of feed rollers 55 and 56 in a stock feeding and inking mechanism 57. The strip of card stock is then fed over tension measuring rollers 58 and 59 and a platen 60 between the feed rolls 61 and 62 to a piercing and slitting die 63. Fig. 29 shows a section of the strip of card stock after it is acted upon by the die 63 from which it is passed over an adhesive applicating roller 64 and a reversing drum 65 to a stencil tissue feeding mechanism 66. The tissue feeding mechanism 66 operates to apply sheets of stencil tissue to the strip of card stock which thereafter passes over a folding rod 67 where the strip is folded longitudinally to form a two ply strip to pass between rollers in the closing and pressing mechanism 68. The strip is then fed by the last mentioned rollers under the press and cut off die 69, which severs the strip into card lengths each containing a stencil tissue portion. The card 72, thus formed, (see also Fig. 30) is thereafter fed between the ejector rolls 70 and 71 onto a table 73. The completed card 72 is shown in Fig. 30. Each of the components referred to above will be identified or described in detail later herein.

With further reference to Fig. 1, the prime mover for the machine is an electric motor 74 which drives a pulley 75 attached to a shaft 76. A dual speed drive assembly, provided with the necessary gearing, is connected to the shaft 76 by a clutch mechanism under control of a handle 77 to provide low speed and high speed machine operation. The drive mechanism will be described in detail later herein. Hoppers 78 are provided in the base of the machine to receive the cuttings from the card stock under action of the die 63. A necessary accessory to the subject machine is a pump 79, capable of providing both suction and compressed air, which is also located in the base of the machine. A reservoir 80 is located at one end of the machine for containing liquid adhesive such as glue. A pump 81 is provided for pumping the adhesive liquid from the reservoir 80 to a pan 82 (see Fig. 14) which is associated with the adhesive applicating roller 64. The spindle 50 is adjustable vertically by the way of a threaded shank 83 and a threaded rod 84 coacting with an intermediate threaded member 85, which is controlled through a flexible shaft 86 by a handwheel 87.

Figure 2:
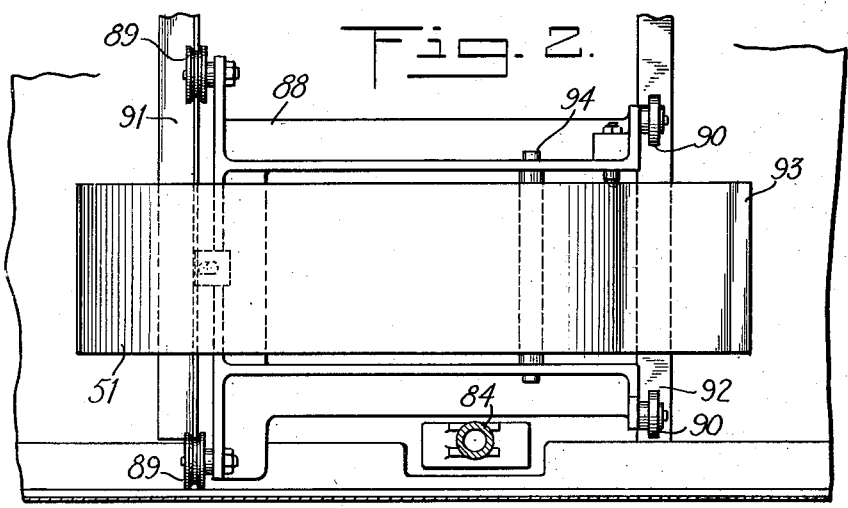
Fig. 2 is a sectional view of the stock roll loading mechanism along the lines 2—2 of Fig. 1.
Figure 3:
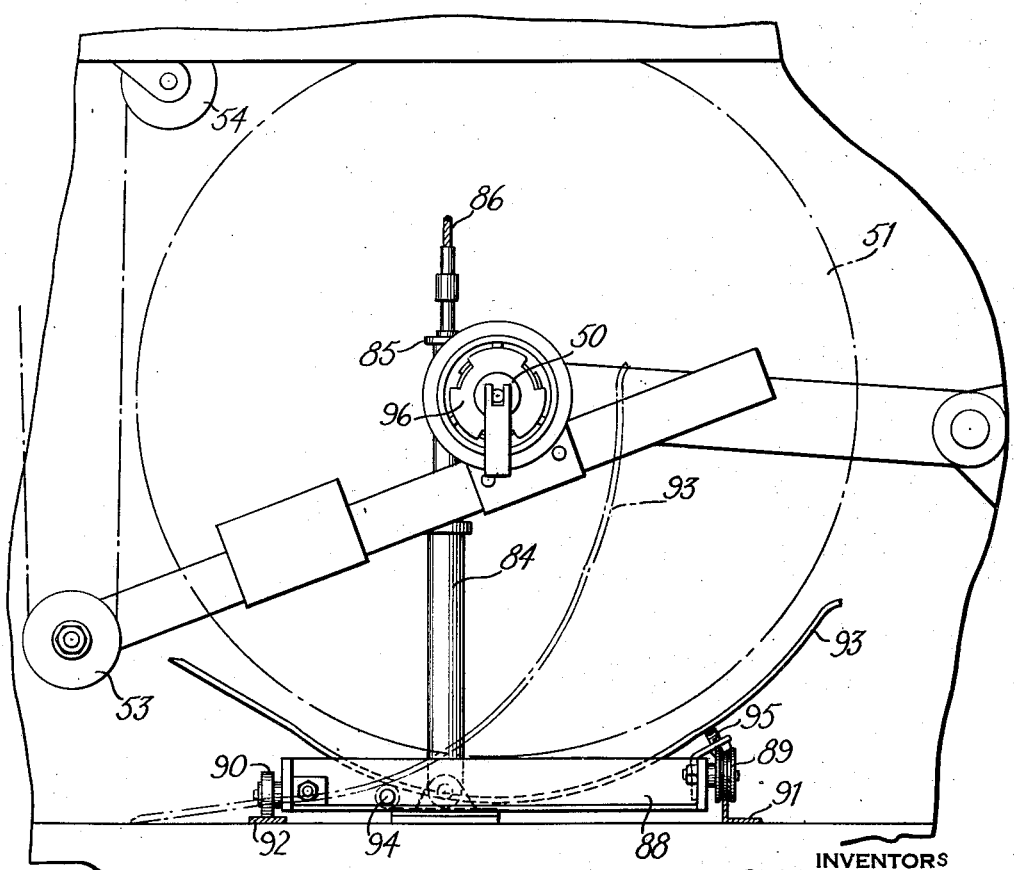
Fig. 3 is a rear elevation view of the stock roll loading mechanism.

Normally rolls of card stock for machines of this type weigh several hundred pounds, and a lone operator cannot replenish a roll of card stock without assistance. In the subject machine, a novel mechanism is employed for loading rolls of stock onto the spindle 50. Figs. 2 and 3 illustrate the stock roll loading mechanism. A movable platform 88, provided with guide wheels 89 and support wheels 90, rolling respectively on a guide rail 91 and a supporting strip 92, is capable of being withdrawn from the rear of the machine, as viewed in Fig. 1. An arcuate plate 93, pivoted upon the platform 88 by a shaft 94, is lifted from a stop 95 to the position shown by the dot-dash lines of Fig. 3. A fresh roll of card stock may be rolled then onto the plate 93. The weight of the roll causes the plate 93 to turn about its pivot at shaft 94 so that the plate 93 finally rests against the stop 95. The platform 88 is then moved toward the machine and the spindle 50 is aligned with the center of the new roll of stock by operating handwheel 87 (see Fig. 1). The roll of stock is then pushed onto the spindle 50 which is again adjusted to clear the stock rollers from the supporting plate 93. The stock roll is secured to the spindle 50 by the clamp 96, and the new roll of card stock is ready to be fed into the machine.

With reference to Figs. 4 and 5, the stock feeding and inking mechanism 57 comprises a straightening roller assembly 97, feed rollers 55 and 56, tension indicating rollers 58 and 59, a platen 60, and an inking mechanism 98. The feed rollers 55 and 56 pull the card stock from the roll 50, and are power driven from a shaft 99 by way of a sprocket 100, a chain 101, a sprocket 102, a shaft 103, a gear 104, an idler gear 105, and a gear 106 on the shaft which carries the roller 55. The roller 56 is geared to roller 55 by two gears 107 and 108.

The inking mechanism 98 is a conventional type provided for printing a design on the card stock, and it may take the form shown whereby a pair of discs 109 stripes the card stock when it passes over the platen 60 (see the stripes 60a in Fig. 29). The discs 109 are mounted on a tube 110 which is geared to the shaft 103 by the gears 111 and 112. Ink is supplied from a pan 113 to a knurled roller 114 which contacts the discs 109. The roller 114 is connected directly to the shaft 103.

The feed rolls 61 and 62 are geared together by the gears 115 and 116, the gear 116 being fastened to the drive shaft 99. The tension rolls 58 and 59 are not driven, merely being rotated by frictional contact with the card stock passing around and between them. The roller 58 is mounted on a shaft 117 which is spring urged to cause roller 58 to bear on roller 59 (see Fig. 6). The roller 59 is mounted on a shaft 118 carrying a drum 119 surrounded by a brake shoe 120. An adjustable band 121, the ends of which are held together by a bolt 122, causes the brake shoe 120 to bear against the drum 119. A lever 124 is fitted at its center to turn freely on the shaft 118, one end of the lever being attached to an end of the band 121 by a stud 123, and the other end of the lever bearing on an arm of a second lever 125, pivoted on a stud 126. The other arm of the lever 125 bears against a pressure indicating stem 127 mounted in a block 128. As the card stock moves to rotate the roller 59, the torque developed by the lever 124, as a result of its association with the brake band 121, will be a measure of the tension in the strip of card stock. This torque is transmitted by the lever 125 to the pressure indicating stem 127 which may be provided with a suitably calibrated gage (see gage 129 of Fig. 1) to give a visual indication of the tension in the card stock.

Referring to Fig. 7, the ejector rolls 70 and 71 are geared together by the gears 130 and 131 which are attached respectively to the shafts 132 and 133. At one end of the shaft 133 a bevel gear 134 is attached, which engages and is driven by a bevel gear 135 fastened to a shaft 136. On the opposite end of shaft 136 a bevel gear 137 provides a drive for the shaft by engaging another bevel gear 138 fastened to the shaft 99. The shaft 99 is driven by a bevel gear 139 which meshes with a bevel gear 140 fastened to the end of a drive shaft 141 (see Fig. 13).

The drive mechanism is shown in Figs. 8 and

13. A belt 142 transmits power from an electric motor 74 (see Fig. 1) to the pulley 75 mounted on the shaft 76 which drives a gear train controlled by a clutch 143 to drive a shaft 144 and a gear 145 mounted thereon at either of two speeds, the clutch being controlled by an arm 146 coacting with the handle 77. The gear 145 engages and drives a bevel gear 147 fixed to the main drive shaft 148, which also carries two bevel gears 149 and 150. The gear 150 drives a bevel gear 151 attached to a cam shaft 152, which carries also two box cams 153 and 154, each of the cams having two internal grooves in which cam followers 155 and 156 ride. (Note that the followers are omitted from the cam 154 in Fig. 8.) The followers 155 and 156 are carried respectively by two arms 157 and 158. The gear 149 drives a bevel gear 159 attached to the shaft 141, which provides drive for the shaft 99 previously mentioned. Another bevel gear 160, fastened to a shaft 161, is driven also by the gear 149. The shaft 161 terminates in a bevel gear 162 which drives a gear 163, attached to a shaft 164 at the end of the machine opposite the shaft 99 (see Fig. 13).

With reference now to Figs. 8, 9, 10, and 12, the operation of the piercing and slitting die 63 will be described. A punch plate 165 is mounted upon a stripper plate 166 by a plurality of springs 167, and has four operating posts 168 connected to its corners. The posts 168 are connected through a parallel linkage 169 to the cam follower arm 157 pivoted at 170 on a bearing block 171 on the die bed 172. The punch is operated to provide cutting action by the follower 155 riding in the groove 155a of the cam 153. The punch and die assembly is reciprocated longitudinally with the strip of card stock by the cam follower arm 158 and its linkage 173 which is connected to the bearing block 171 by a stud 174. The arm 158 is pivoted at 175, and its follower 156 rides in the groove 156a in the cam 153. Rollers 176 are provided to permit the punch and die assembly to ride on rails 177 in the machine frame.

The card stock is slotted and cut as shown in Fig. 29. The central longitudinal slot 178 and the transverse slot 179 going slightly more than half-way across the strip permit folding of the strip into card length units. The scorings 180 between longitudinal slots 178 facilitate folding. The rectangular openings 181 form the window into which the stencil sheet is to be inserted. Now referring to Fig. 10, the punches for the rectangular openings are shown at 182, that for the longitudinal slot at 183, and the punch for the transverse slot at 184. At each end of the slotting punch 183 is a scoring device 185, pivoted to the punch plate 165 by a bracket 186. Each scoring device 185 carries a knife 187 which is aligned with the slotting punch 183. Fig. 11 gives a view of the scoring device in more detail. A spring 188 applies a limited pressure to the knife 187 so that the card stock is cut nearly through at the scorings 180 (as shown in Fig. 29). A calibrated knob 189 on a threaded shaft 190 serves to adjust the tension on the spring 188 thereby regulating the depth of cut of the knife 187.

The adhesive applicating roller 64 and its associated mechanism is located near one end of the machine (see Fig. 1). Normally the adhesive or glue is pumped from the reservoir 80 by the pump 81 through a pipe 191 and a valve nozzle 192 into the pan 82 (see Fig. 14). The roller 64 dips into the pan 82 and picks up the adhesive which is reduced to a uniform thickness by a doctor roller 193 which is spaced from the periphery of roller 64. Both rollers are driven at the same angular speed so that there is both rolling and scraping action between them due to the difference in their peripheral speeds, the roller 64 being greater in diameter than roller 193. Power to drive these rollers is derived from the shaft 161 (previously mentioned) by way of bevel gears 162 and 163, shaft 164, gear 194, gear 195, and gear 196. The gears 195 and 196 are identical, the gear 195 driving the roller 193 and the gear 196 driving the roller 64. Also attached to the shaft 164 is a sprocket 197 over which a chain belt 198 travels to drive the tissue feeding mechanism later described herein.

Now referring to Fig. 15, the drum 65 at the extreme end of the machine is free to rotate upon its supporting bearings 199, being rotated by the strip of card stock passing around it. The bearings 199 are carried by a shaft 200 which has threaded extensions on each end beyond these supports. Threaded onto the extensions are trapezoidal blocks 201, each block being guided in an inclined slot cut into a bearing cap 202 supported by a bearing plate 203 at each extremity of the shaft 200. The caps 202 are held to the plates 203 by cap bolts 204 through elongated holes in the caps 202. Normally the alignment of the axis of the drum 65 may be made by adjusting two positioning screws 205, the cap bolts 204 being loosened. An adjustment of the shaft bearings longitudinally of the machine may be made in the same way when the machine is idle, the cap bolts 204 being loosened. When the machine is operating, however, it may be necessary to shift the axis of the drum 65 in order to secure proper registration of the strip of card stock under the cutting knife of the die 69. To make such an adjustment, one end of the shaft 200 is provided with a projection 206 which accommodates a crank. Rotation of the shaft 200 by the crank causes the blocks 201 to be shifted simultaneously, thereby shifting the axis of the drum 65 longitudinally of the machine. The shaft 200 is prevented from moving in the direction of its axis by the provision of a shoulder 207 which bears against one side of a plate 208, attached to the cap 202 at one end of the shaft, while an additional threaded portion of the shaft 200 permits two nuts 209 to be fastened to bear against the other side of the plate 208.

Reference is made to Figs. 16, 17, 18, 19, and 20 relative to the tissue feeding mechanism 66. Sheets of stencil tissue are supplied from a stack in a hopper 210. A jet of air from a pipe 211 is blown through an orifice 212 to fan the edges of the top sheets against a retaining catch 213 (see Fig. 20). A suction foot 214, due to motion imparted to it, dips into contact with the top sheet withdrawing the sheet from under the catch 213. The foot 214 then rises and moves in the opposite direction (to the left as viewed in Fig. 19) drawing the sheet to a position above a hollow feed drum 215, which seizes the sheet in a manner to be explained later herein, and the foot 214 returns to its original position above the hopper 210. The foot 214 is mounted by means of the tubes 214a on a carriage 216. The carriage 216 is connected by a link 218 to an arm 219, which is oscillated by an eccentric strap 220, thereby reciprocating the carriage over a slide 217 carrying it. The slide 217 is carried by an arm 221 pivoted at 222 on a bracket 223 and has a cam follower 224 supported upon it by a foot 225. The follower 224 rides a cam 226, which raises the slide 217, or lowers it. The motion of the foot 214 thereby is made up of the composite motions of the reciprocating carriage 216 and the raising and lowering of the slide 217.

The feed drum 215 is a semi-hollow roller provided with two active sectors 227 and two inactive sectors 228 (see Figs. 18 and 19). The active sectors 227 have a series of holes 229 the axes of which are parallel with radii of the drum 215. Striating channels are provided on the periphery of the drum 215 extending laterally from each hole 229. A circular face valve 230 has an elongated arcuate port 231 (Fig. 18), which is maintained at a pressure below atmospheric by a pipe 232 leading to the pump 79. The valve 230 also has a port 233 (Fig. 18), which is maintained at a pressure above atmospheric by a pipe 234 leading to the pump 79. The holes 229 in drum 215 are arranged to have channels 235 which connect with the ports 231 and 233 so that, as the drum 215 is rotated, each hole 229 will communicate with the port 231 from the time it passes the top center line of the drum 215 until it reaches the bottom center line of the drum 215 (see Fig. 19), and thereafter for a fraction of the drum's cycle of rotation each hole 229 will communicate with the port 233.

Normally when air pressure is suddenly applied through an opening in a member against a thin diaphragm applied thereto, as for example, a stencil sheet covering one of the holes 229 of the drum 215, momentarily the diaphragm is displaced from the opening; however, immediately thereafter the velocity of air escaping from the opening between the diaphragm and the member reduces the pressure below the normal pressure on the outside of the diaphragm so that the diaphragm is forced back against the member. In the subject device this phenomenon is averted by having a portion of the stencil sheet overhanging the area of an active sector 227 of the drum 215, the overhanging portion of the stencil sheet being seized by the adhesive surface of the card stock upon coming into contact therewith.

In the manner just described a sheet of stencil tissue delivered to the drum 215 by the foot 214 will be held to the periphery of the drum by the suction from the holes 229 for a predetermined period as the drum is rotated, and then gradually forced from the periphery of the drum by successive blasts of air from the holes 229, the stencil sheet being seized after each blast by the adhesive coating on the card stock, thereby effecting a peeling of the sheet from the drum 215. The valve 230 is adjusted by a rod 236 so that a sheet of stencil tissue is forced from the drum as the sheet passes the bottom center line of the drum 215 (see Fig. 19) where the card stock passes over a counterroller 237, the adhesive surface of the card stock contacting a stencil tissue for the first time in that location. The card stock is fed between the drum 215 and the roller 237 so that an opening 181 (Fig. 29) is superimposed by a stencil tissue being delivered from the drum 215. It is to be noted that the striating channels provided with the holes 229 on the periphery of the drum 215 are to prevent the deformation of the thin stencil sheets. It is to be noted further that suction is constantly applied to the foot 214 and that a stencil tissue is removed from the foot 214 by being seized between the drum 215 and a feed roller 238 (see Fig. 17), the stencil sheet passing under the roller 238 onto the periphery of the drum 215 and being adhered thereto by suction from the holes 229.

The counterroller 237 is journalled on a rocking frame 239 (see Fig. 18) which is supported on a shaft 240, and is urged to rotate about the shaft in a clockwise direction by a spring 241, thereby holding the roller 237 against the drum 215. A cam 242 of similar contour is mounted coaxially to the drum 215. Cam 242 coacts with a roller 243 journalled on an arm 244 pivoted on the frame 239 by a stud 245. An interposer 246 pivoted on another stud 247 on the frame 239 is provided with two notches 248 and 249 to coact with a pin 250 on the arm 244. The interposer 246 is biased by a spring 251 so that the roller 243 will be positioned to cause the rocking frame 239 to be displaced by the cam 242 withdrawing the roller 237, and the strip of card stock passing over it, from contact with the drum 215.

The exhaust 252 of a normally expanded bellows 253 is connected with the port 231. A Bowden wire 254, attached to the diaphragm of the bellows, is fastened to the interposer 246 by a clamp 255 so that when the bellows is expanded the interposer is held with the notch 249 engaging the pin 250 (as shown in Fig. 18). The bellows 253 will be expanded by atmospheric pressure when there is no sheet of stencil tissue covering the holes 229, when the valve 230 is improperly adjusted, or when the vacuum section of pump 79 fails. In any of these events the peripheral surface of the drum 215 will not be contacted by the adhesive material on the card stock since the roller 237, which supports the card stock under the drum, is cammed away. Normally, however, when the machine is operating there will be sufficient suction from the port 231 to hold the bellows 253 in a collapsed state thereby tensioning the Bowden wire 254 to pull the interposer 246 to engage the notch 248 with the pin 250 whereby the roller 237 is no longer cammed away from the drum 215.

The drive for the tissue feeding mechanism 66 is provided by the chain 198 (see Figs. 1 and 14) which engages and drives the sprocket 256 (Fig. 17). The sprocket 256 is fixed to a shaft 257 which carries a gear 258, the drum 215, and the cam 242. The spring 259 shown about shaft 257 is for the purpose of holding the drum 215 against the valve 230, a type of face valve. The gear 258 drives a gear 260 which is fixed to a shaft 261 carrying a gear 262, the cam 226, the feed roll 238, and a cam 264 (which operates the eccentric strap 220). The gear 262 drives the hopper feed gearing (Fig. 25) by way of the idler gears 265 and 266, the gear 267, and the shaft 268. The shaft 268 has affixed to it a bevel gear 269 which drives another bevel gear 270 attached to a hopper feed shaft 271.

Details of the suction foot 214 are shown in Figs 21 and 22. It is to be noted that the views in Figs. 21 and 22 represent approximately one-half of the suction foot, there being two such sections 214b per suction foot. The bottom of the foot is made concave as shown (see also Fig. 20) so that not more than a single sheet of stencil tissue is picked each time the foot engages the stack in the hopper 210. Striations 272 are provided in the bottom of each section of the foot to insure uniform gripping of the stencil sheet and to prevent its becoming deformed due to the action of atmospheric pressure.

In order that the stack of sheets of stencil material is presented properly to the suction foot 214, as a result of the jet of air blown from the orifice 212, the top of the stack must be kept constantly at a uniform distance from the catch 213

(Fig. 20). A hopper feed is provided as shown in Figs. 23 and 24. A platform 273 is provided and arranged to be elevated within the hopper 210 to lift the stack of sheets as they are withdrawn by the foot 214. An extension of the platform 273 is attached to a collar 274, which rides on a threaded part 275 of the hopper feed shaft 271. The collar 274 is provided with a toothed lug 276 which is spring urged against the threaded part 275 to advance the collar and its associated platform as the shaft 271 rotates. A handle 277 serves to release the lug 276 so that the platform 273 may be lowered when a freshly filled hopper is placed in the machine.

Figure 26:
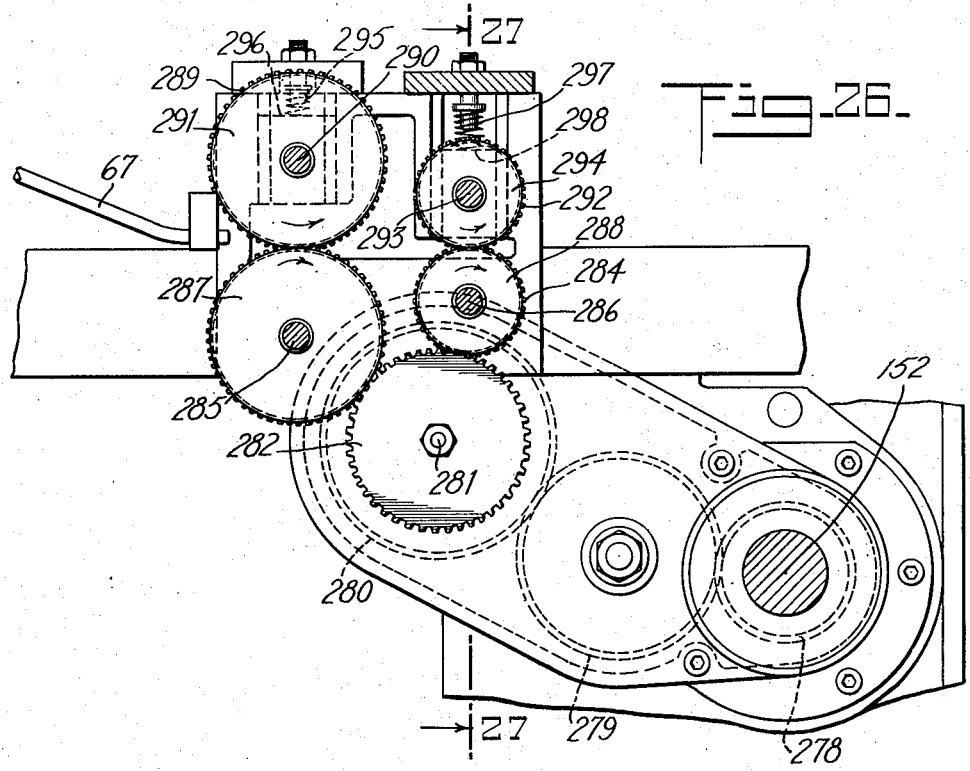
Fig. 26 is a detail view in section of the closing and pressing roller mechanism.
Figure 27:
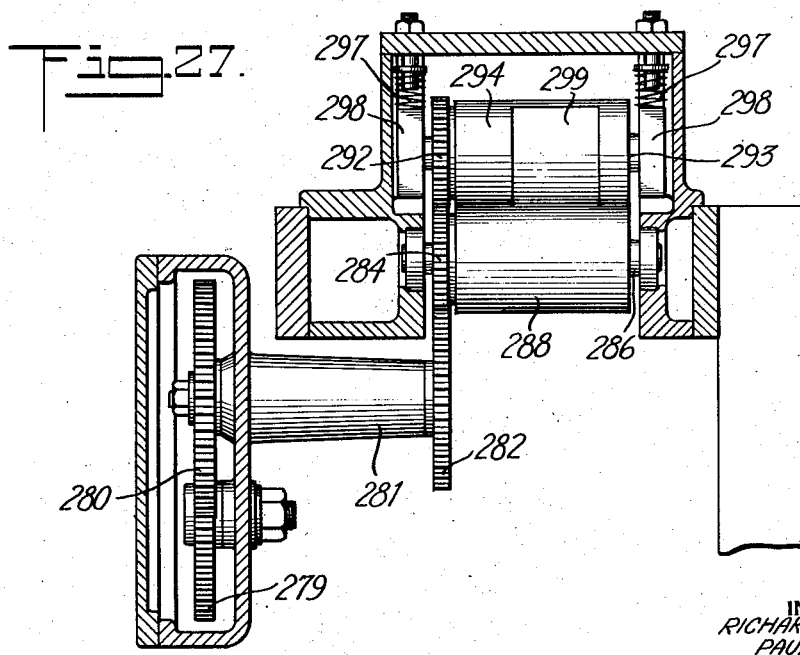
Fig. 27 is a sectional view of the pressing rolls taken along the line 27—27 of Fig. 26.

After the strip of card stock leaves the tissue feeding mechanism 66 it passes over the folding rod 67 (see Fig. 28) where the top half of the strip, as viewed in Fig. 29, is folded over the bottom half, and the folded strip is fed to the closing and pressing roller mechanism 68. This mechanism is shown in Figs. 26 and 27. A gear 278 on the cam shaft 152 (see Fig. 8) drives an idler 279 which engages and drives a gear 280 on a shaft 281 carrying a drive gear 282. The gear 282 drives both of the lower roller gears 283 and 284, fixed respectively to the shafts 285 and 286, which carry respectively the rollers 287 and 288. The gear 283 drives another gear 289 attached to a shaft 290 which carries a roller 291 coacting with the roller 287 to form the entry rollers of the mechanism. The gear 284 drives another gear 292 attached to a shaft 293 which carries a roller 294 coacting with the roller 288 to form the exit rollers of the mechanism. The rollers 287 and 291 are urged together by springs 295 acting on bearings 296 which support the shaft 290. The rollers 288 and 294 are urged together similarly by springs 297 acting on bearings 298 which support the shaft 293; however, the pressure between the rollers 288 and 294 is greater than between the rollers 287 and 291. In passing successively under the rollers 287 and 291 and then the rollers 288 and 294, the folded card stock is firmly compressed, there being a recessed sector 299 on the roller 294 arranged to relieve pressure upon the window area 300 (Fig. 30) due to the increased thickness of the two ply strip by the inclusion of the stencil, thereby protecting the stencil portion from becoming deformed.

The rollers 288 and 294 push the strip of card stock under the press and cut-off die 69, which operates to cut the stock into predetermined card lengths. The die 69 is similar to the die 63 in its operation, being reciprocated with the card stock and lifted by a pair of arms and cam followers actuated by the cam 154 (Fig. 8). The die 69 is timed to sever the card stock after a preceding cut edge has encountered the ejector rolls 70 and 71. Stencil cards 72 therefore emerge from the ejector rolls 70 and 71, as shown in Fig. 30, where a stencil sheet 301 is contained between two layers of card stock of predetermined size.

While there have been shown and described and pointed out the fundamental novel features of the invention as applied to a preferred embodiment, it will be understood that various omissions and substitutions and changes in form and details of the device illustrated and in its operation may be made by those skilled in the art without departing from the spirit of the invention. It is the intention, therefore, to be limited only as indicated by the scope of the following claim.

What is claimed is:

In a stencil card making machine wherein a web of paper is fed in one direction from a supply roller to a reversing roller and thereafter in the other direction to a pair of ejecting rollers, supports for the said rollers, a plurality of means interposed between the supply roller and the reversing roller for operating on the web comprising printing means and perforating means for cutting a pair of coincident openings in each half longitudinally of the web, the said means being mutually indexed, a second plurality of means interposed between the reversing roller and the ejecting rollers for operating on the web comprising a means for attaching a stencil sheet over one of each pair of said openings and a means for severing the web into predetermined lengths, said attaching means and said severing means being mutually indexed, and means comprising bearings for the said reversing roller fixed in a pair of trapezoidal blocks adjustably mounted respectively in a pair of inclined slots formed in the reversing roller supports for translating the said reversing roller in the path of feed of the web to bring the perforated and printed portions of the web into registration with the said attaching means and the said severing means.

RICHARD H. HOLMWOOD.
PAUL A. HAUCK.

REFERENCES CITED

The following references are of record in the file of this patent:

UNITED STATES PATENTS

| Number | Name | Date |
|---|---|---|
| 667,822 | Goebel | Feb. 12, 1901 |
| 1,073,393 | Campus | Sept. 16, 1913 |
| 1,121,080 | Elliott | Dec. 15, 1914 |
| 1,135,786 | Funk | Apr. 13, 1915 |
| 1,562,085 | Foster | Nov. 17, 1925 |
| 1,831,167 | Gangler | Nov. 10, 1931 |
| 1,872,130 | Elliott | Aug. 16, 1932 |
| 2,203,706 | Stockbarger | June 11, 1940 |
| 2,405,637 | Behrens | Aug. 13, 1946 |

FOREIGN PATENTS

| Number | Country | Date |
|---|---|---|
| 401,409 | Great Britain | Nov. 16, 1933 |